3,459,852
DEODORIZING TREATMENT OF
AQUEOUS SOLUTIONS
Dan Christian Roehm, 11 SE. 12th Ave.,
Fort Lauderdale, Fla. 33304
No Drawing. Continuation-in-part of application Ser. No. 507,250, Nov. 10, 1965. This application Mar. 31, 1966, Ser. No. 538,952
Int. Cl. C02c 5/02, 1/40
U.S. Cl. 424—76     18 Claims

ABSTRACT OF THE DISCLOSURE

There is provided a process for deodorizing and reducing the biochemical demand of an aqueous solution which contains at least one compound of hydrogen sulphide and compounds containing the —SH group. The process comprises mixing with the solution a sulphide-active alpha, beta unsaturated aldehyde or ketone in an amount sufficient to form sulphur-containing reaction product of the sulphide active aldehyde or ketone.

---

This is a continuation-in-part of my copending application, Ser. No. 507,250, filed Nov. 10, 1965.

This invention relates to the deodorization of aqueous solutions. More particularly, this invention relates to a new concept in deodorizing such aqueous solutions as municipal and industrial wastes, swamps, sewage, stagnant water, putrid water courses and the like, by treatment of the odiferous materials, particularly the sulphur bearing components, and thereby preventing objectionable odors from fouling the atmosphere or clean water resources.

The presently believed most important application of the invention is in the area of deodorization of sewage containing pungent or odorous sulphides or hydrosulphides. The waste production and waste treatment problem has advanced to the point where atmospheric odors from waste carrying streams and waste disposal plants are of concern in many areas, especially in urban centers. These odors are offensive when detected in the air, and may be detected by taste in some drinking water, due to seepage. This is the case not only in populous areas generally, but particularly during warm weather and in warmer climes where higher average temperatures contribute to a faster average decomposition rate for sewage and wastes. At one time, these problems could be obviated by greater sewage dilution and/or by moving the sewage plant away from urban areas. Water for dilution is becoming more scarce however, and urban areas have increased in size to the point where it is no longer economical to move a sewage plant further away from the urban centers and into the country; moreover, the open country is fast disappearing. Hence, the situation demands an improved technological approach.

Typically, present day practice to remove sewage odors involves the oxidizing by aeration, possibly supplemented with additional oxidizing agent in bulk, for example, sodium nitrate. However, these procedures are ineffective and quantities of hydrogen sulphide and mercaptans often escape prior to oxidation. Some sewage disposal plants also spray the atmosphere in the vicinity of the plant, with a pleasant smelling masking compound, which does not really solve the problem. These types of treatment have, moreover, little effect on odiferous mercaptan compounds.

It is the principal object of this invention to provide a new, efficient, and relatively inexpensive means of treating aqueous sewage solutions to reduce the odors thereof, particularly the sewer gas sulphide odors.

Other and further objects of this invention, together with an appreciation for the advantages thereof, will become apparent as this description proceeds.

This invention essentially resides in the use and discovery that certain aldehydes and ketones when added to sewage waters containing objectionable odiferous sulphide compounds, will render such waters substantially free from odors of such substances. According to the invention, alpha,beta aliphatically-unsaturated aldehydes and ketones, hereinafter called "sulphide-active" compounds, are used. The simplest "sulphide-active" aldehydes and ketones to be used are acrolein and 3-buten-2-one, which are presently preferred compounds. They appear to perform exceptionally well in rendering essentially nonodorous the sulphide content in raw sewage. Other suitable aldehydes and ketones are identified hereinafter.

For the treatment of sewage, the invention may consist in introducing the "sulphide-active" aldehyde or ketone upstream of the treatment plant, such as at various pumping stations en route, after which the "sulphide-active" compounds will mix with the sewage in transit and react to convert the sulphides, etc., into an odorless form. Other appropriate points of introduction may also be used. This introduction of the "sulphide-active" aldehydes and ketones does not interfere with other processes of sewage treatment, such as oxidation by aeration, bacterial action, and the like. Within normal treatment times in the sewage plant, the thus treated solution is rendered free from sulphide odors.

In a further series of tests, treatment according to the invention actually appears to also reduce the BOD (Biochemical Oxygen Demand) of sewage and industrial wastes.

The process according to the invention may also be used for removal of hydrogen sulphide from water used for drinking purposes, or water from wells used to water lawns. This may be accomplished with the use of a dialyzing membrane or some similar device.

Tests according to the invention have been run on artificially prepared chemical solutions of sulphide, as well as on raw sewage of measured sulphide content. In general, the tests show extremely good odor-reducing activity, even in raw sewage where many contaminants abound.

More specifically stated, the invention resides in the use of compounds having the following alpha,beta aliphatically unsaturated aldehyde or ketone moiety as the reactive portion:

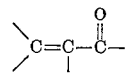

This may occur in compounds of the general formula:

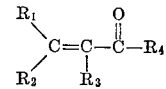

wherein each or any of the R substituents may be hydrogen or alkyl, with hydrogen or lower alkyl preferred, particularly in $R_1$, $R_2$, and $R_3$. $R_1$ or $R_4$ may be a simple aryl radical. Certain of the R groups may be substituted alkyl or aryl, such as $R_4$—OH, and as the examples will show, $R_4$ may be replaced by hydroxy, methoxy, amine, or chloride. $R_1$ may be replaced by methoxy and ethylenically unsaturated moieties. Other R substituents may also be found suitable.

As typical examples, the invention can utilize such alpha, beta unsaturated ketones as: 3-buten-2-one; 3-hydroxy-2-cyclohexen-1-one; 4-methoxy-3-buten-2-one; 4-(2-furyl)-3-buten-2-one; and 5-phenyl-2,4-pentadienophenone. Also thought to be suitable are the normal and iso-3-penten-2-one, the 3-hexen-2-ones, including mesityl oxide; and such of 3-hepten-2-ones; 3-octen-2-ones, etc., as exist; and so on, through the alkene series, including various substituted compounds and isomers thereof. The invention can use such alpha,beta unsaturated aldehydes as: acrolein, alpha and beta methyl acrolein (trans 2-butenal or crotonaldehyde), trans-cinnamaldehyde, and tiglaldehyde. Also thought to be suitable are such aldehydes in the alkene series as exist, including 2-pentenal; 2-hexenal; 2-heptenal, and so on.

Other substituted compounds equivalent to the aldehyde, are also suitable, such as ethacrynic acid (2,3-dichloro-4-(2 - methylenbutyryl)phenoxy)acetic acid and compounds that are not true aldehydes or ketones such as: acrylic acid and its methyl ester, tert-butylacrylamide and crotonyl chloride.

It is advisable to employ the use of a stabilizer such as hydroquinone when working with acrolein and the other "sulphide-active" compounds, which tend to polymerize easily and may even do this to some extent whether a stabilizer is used or not.

The most effective compounds are the two simplest, acrolein and 3-buten-2-one.

Although it is not intended to limit this invention to any particular theory, it is believed that when an alpha, beta unsaturated aldehyde or ketone is reacted with hydrogen sulphide, the following adduct may be one of the reaction products:

$$R_2-\overset{R_1}{\underset{SH}{C}}-\overset{H}{\underset{R_3}{C}}-\overset{O}{\overset{\|}{C}}-R_4$$

wherein the "R" groups have the meaning defined above. It may be that the reaction proceeds further:

$$\underset{R_2}{\overset{R_1}{C}}=\underset{R_3}{\overset{O}{\overset{\|}{C}}}-R_4 + R_2-\underset{SH}{\overset{R_1}{\underset{|}{C}}}-\underset{R_3}{\overset{H}{\underset{|}{C}}}-\overset{O}{\overset{\|}{C}}-R_4 \longrightarrow \begin{matrix} R_1 & H & O \\ \diagdown & | & \| \\ C-C-C-R_4 \\ R_2 / | & R_3 \\ S \\ R_1 & H & O \\ \diagdown & | & \| \\ C-C-C-R_4 \\ R_2 / | & R_3 \end{matrix}$$

"Hydrogen Sulphide Adduct"    "Hydrogen Sulphide Polymer"

The range of concentration used in this invention depends on the activity of the compound selected. Most important in determining the concentration is the amount of sulphide or mercaptan odor content expected in the sewage, as illustrated by the specific examples. Usually this will fall in the range of about 1 to 200 parts of "sulphide active" compound per million parts of sewage to react with the expected sulphide or mercaptan content. The temperature and pH conditions are necessarily referred to as the "ambient" conditions, due to the huge volumes being dealt with.

Understanding of the invention will now be facilitated when attention is given to the following series of examples. The examples should be interpreted as illustrative, rather than limiting on the invention.

EXAMPLE 1

The following are tests illustrating the efficiency of acrolein and 3-buten-2-one for deactivating sewage odors, using a liter of water to which sufficient Na$_2$S had been added to bring the S$^=$ concentration to 10 parts per million(p.p.m.). The arcolein had been diluted 1:10 in water and allowed to stand this way for several weeks. Thirty drops of the diluted acrolein were used and three drops of pure 3-buten-2-one were used.

The acrolein test gave these results:

| Time (min.): | Sulphide ion concentration, p.p.m. |
|---|---|
| Control | 10 |
| 7 | 8 |
| 21 | 3 |
| 32 | 1.5 |

The 3-buten-2-one test gas these results:

| Time (min.): | Sulphide ion concentration, p.p.m. |
|---|---|
| Control | 10 |
| 7 | 8 |
| 21 | 2 |
| 30 | 1 |

These two tests are virtually identical. The acrolein had polymerized some and the size of the drops of the two chemicals may have been slightly different, due to different viscosities.

EXAMPLE 2

Another series of tests were run with the same amounts of the sulphide active compounds, except that 20 p.p.m. of S$^=$ were present in the liter of water to which about 10 drops of 2.5 molar sodium hydroxide had been added.

The second acrolein test gave these results:

| Time: | Sulphide ion concentration, p.p.m. |
|---|---|
| Control | 20 |
| 18 min. | 16 |
| 33 min. | 13 |
| 100 min. | 10 |
| 140 min. | 9.5 |
| 175 min. | 7.5 |
| 17 hours | 0 |

The 3-buten-2-one test gas these results:

| Time: | Sulphide ion concentration, p.p.m. |
|---|---|
| Control | 20 |
| 91 min. | 10 |
| 154 min. | 7.5 |
| 17 hours | 3.5 |

Following these tests, it was determined that twenty-five drops of 1:10 acrolein give about one cc. liquid volume, as do about fifty drops of pure 3-buten-2-one. Therefore, 3 drops of pure acrolein equal 20 plus p.p.m. of sulphide ion per liter and 3 drops (3/50 cc.) pure 3-buten-2-one equal 16.5 p.p.m. of sulphide ion per liter. This shows some superiority of acrolein, but only a slight difference. However, these two compounds are so close as to be in a class by themselves. Hence, these compounds are preferred for their high yield in treating sewage.

EXAMPLE 3

This test was then run to compare the effectiveness of alpha methyl acrolein of the formula $$\underset{H}{\overset{H}{\diagdown}}C=\underset{CH_3}{\overset{O}{\underset{|}{C}}}-\overset{\|}{C}-H$$

to 3-buten-2-one and acrolein.

Three drops of concentrated alpha methyl acrolein were added to one liter (1000 cc.) of an aqueous solution containing 10 p.p.m. of sulphide ion from Na$_2$S, with these results:

| Time: | Sulphide ion concentration p.p.m. |
|---|---|
| Control | 10 |
| 20 min. | 6 |
| 35 min. | 5 |
| 1 hr. | 3 |
| 2 hrs. | 1 |

EXAMPLE 4

A further test was run to compare the test solutions to raw sewage by using sewage containing twelve p.p.m. "natural sulphide," then adding enough Na$_2$S to bring the sulphide ion content up to 20 p.p.m. The test was conducted by adding one cc. of a 1:10 aqueous solution of 3-buten-2-one (0.1 cc. pure chemical). This quickly neutralized all twenty p.p.m. of sulphide ion. Next, this was repeated, using 0.5 cc. of the 1:10 dilution (0.05 cc. pure chemical), giving a fall from twenty p.p.m. to four p.p.m. sulphide ion in one hour. Comparing this with Example 2, it appears that 0.06 cc. (3/50 cc.) 3-buten-2-one equal approximately 16.5 p.p.m. sulphide of $Na_2S$ solution, while 0.05 cc. of 3-buten-2-one equal approximately 16 p.p.m. sulphide in sewage. In other words, the effective yields of the preferred compounds according to the invention, as close as can be measured, appears to be about the same in sewage as in alkaline aqueous sodium sulphide solution.

EXAMPLE 5

Another evaluation of efficiency or yield was obtained using sewage in the following series of tests. As in many chemical reactions, when pressed to completion, the returns diminish to a degree. One drop of concentrated 3-buten-2-one was added to a first bottle containing one liter of sewage. The control had a sulphide ion concentration of 13 p.p.m. After two hours, the bottle showed a sulphide ion concentration of 5 p.p.m. Therefore, the first drop of 3-buten-2-one is equivalent to about 8 p.p.m. sulphide ion per liter in two hours.

Two drops of 3-buten-2-one were added to a second bottle containing one liter of sewage. The control again had 13 p.p.m. sulphide ion concentration. After two hours, this had dropped to 2.5 p.p.m. Therefore, the first two drops of 3-buten-2-one are equivalent to a sulphide ion concentration of 11.5 p.p.m./liter in two hours.

Three drops of 3-buten-2-one were added to a third bottle containing one liter of sewage. The control again had a 13 p.p.m. sulphide ion concentration. After two hours, the sulphide ion had dropped to 0 p.p.m. Therefore, three drops of 3-buten-2-one deactivate at least 13 p.p.m. sulphide ion per liter in two hours when the test is carried to the point of extinction of measurable sulphide ion.

EXAMPLE 6

The following compares the activity of an alplha,beta methyl acrolein (crotonaldehyde) of the formula:

$$\begin{array}{c} H \\ \diagdown \\ CH_3 \end{array} C=C \begin{array}{c} O \\ \| \\ -C-H \\ | \\ H \end{array}$$

Three drops of the compound were added to one liter of sewage. The control had a sulphide ion concentration of 13 p.p.m.; after two hours, the concentration was 6 p.p.m. Less efficacy is demonstrated than in the compound of Example 5.

The following examples report data obtained, using one liter of sewage in each test of "natural sulphide" content of 10 p.p.m. sulphide ion concentration per liter of sewage. For various reasons, usually differences in solubility, equivalent amounts of the chemicals were not used. Eleven chemicals were tested.

It should be noted that in each case, a control test or "blank," with no chemical added, gave the following results:

| Time (min.): | Sulphide ion concentration, p.p.m. |
|---|---|
| 0 | 10 |
| 60 | 10 |

EXAMPLE 7

This test used trans-cinnamaldehyde of the formula:

$$\langle\bigcirc\rangle-\underset{H}{\overset{}{C}}=\underset{H}{\overset{}{C}}-\overset{O}{\overset{\|}{C}}-H$$

which is not very water soluble. Two cc. of a 1:10 aqueous suspension were used, as follows:

| Time (min.): | Sulphide ion concentration, p.p.m. |
|---|---|
| Control | 10 |
| 41 | 3.5 |
| 61 | 3.5 |
| 251 | 2.0 |

EXAMPLE 8

This test used tiglaldehyde of the formula:

$$\begin{array}{c} H \\ | \\ C=C-\overset{O}{\overset{\|}{C}}-H \\ | \quad | \\ CH_3 \quad CH_3 \end{array}$$

Two cc. of a 1:20 aqueous suspension were used as follows:

| Time (min.): | Sulphide ion concentration, p.p.m. |
|---|---|
| Control | 10 |
| 31 | 6 |
| 65 | 7 |
| 252 | 4 |

EXAMPLE 9

This test used acrylic acid of the formula:

$$CH_2=CH-\overset{O}{\overset{\|}{C}}-OH$$

one cc. of 1:10 dilution were used. The test results were as follows:

| Time (min.): | Sulphide ion concentration, p.p.m. |
|---|---|
| Control | 10 |
| 35 | 7 |
| 65 | 5.5 |
| 255 | 3.5 |

EXAMPLE 10

This test used the methyl ester of acrylic acid of the formula:

$$CH_2=CH-\overset{O}{\overset{\|}{C}}-OCH_3$$

Two cc. of 1:10 suspension gave the following results:

| Time (min.): | Sulphide ion concentration, p.p.m. |
|---|---|
| Control | 10 |
| 38 | 5 |
| 65 | 5 |
| 252 | 2 |

EXAMPLE 11

This test used N-tert-butylacrylamide of the formula:

$$CH_2=CH-\overset{O}{\overset{\|}{C}}-NH-C(CH_3)_3$$

with approximately 0.25 gm. dissolved in two cc. acetone, with these results:

| Time (min.): | Sulphide ion concentration, p.p.m. |
|---|---|
| Control | 10 |
| 43 | 6 |
| 70 | 7.5 |
| 456 | 3 |

EXAMPLE 12

This test used crotonyl chloride of the formula:

$$\begin{array}{c} H \\ \diagdown \\ CH_3 \end{array} C=C \begin{array}{c} O \\ \| \\ -C-Cl \\ | \\ H \end{array}$$

One cc. of a 1:10 suspension in water produced the following results:

| Time (min.): | Sulphide ion concentration, p.p.m. |
|---|---|
| Control | 10 |
| 39 | 6 |
| 65 | 4 |
| 252 | 3.5 |

EXAMPLE 13

This test used 5-phenyl-2,4-pentadienophenone of the formula:

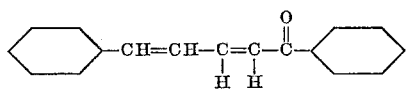

with approximately 0.25 gm. dissolved in two cc. acetone. The results were as follows:

| Time (min.): | Sulphide ion concentration, p.p.m. |
|---|---|
| Control | 10 |
| 42 | 10 |
| 72 | 10 |
| 262 | 6 |

EXAMPLE 14

This test used 4-(2-furyl)-3-buten-2-one of the formula:

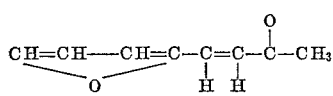

with approximately 0.25 gm. dissolved in two cc. acetone. The results were as follows:

| Time (min.): | Sulphide ion concentration, p.p.m. |
|---|---|
| Control | 10 |
| 52 | 7 |
| 265 | 5 |

EXAMPLE 15

This test used 3-hydroxy-2-cyclohexen-1-one (1,3 cyclohexanedione) of the formula:

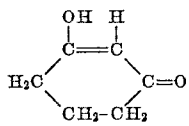

with approximately 0.25 gm. dissolved in two cc. acetone. The results were as follows:

| Time (min.): | Sulphide ion concentration, p.p.m. |
|---|---|
| Control | 10 |
| 46 | 10 |
| 291 | 4.5 |

EXAMPLE 16

This test used 4-methoxy-3-buten-2-one of the formula:

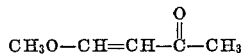

Three drops of the chemical were added to a test solution having ten parts per million sulphide ion per liter of water. The results were as follows:

| Time (min.): | Sulphide ion concentration, p.p.m. |
|---|---|
| Control | 10 |
| 10 | 9 |
| 30 | 8 |
| 115 | 8 |
| 17 | 0 |

EXAMPLE 17

This test used one tenth cc. of 3-buten-2-one in 9/10 cc. water. The results were as follows:

| Time (min.): | Sulphide ion concentration, p.p.m. |
|---|---|
| Control | 10 |
| 11 | 4 |
| 45 | 0 |

Apparently, the zero point was reached well prior to the forty-five minute period.

The examples show that all of the compounds tested have some activity. While the ketones and aldehydes are preferred, the invention is workable with alpha,beta unsaturated aldehydes and ketones wherein there is an aryl, arylalkyl or alkyl, alkoxy (methoxy), acid, ester, amine, and halide (chloride) substituted radical. The poorly soluble compounds work slowly and may need a solvent to help them out. However, they have no odor themselves. Although they work slowly, speed of reaction may not be as important as it seems because some of the sewage in large metropolitan areas is in transit for days. Hence, even slow acting ketones according to the invention have application as "sulphide-active" ketone, particularly when predissolved in a suitable organic solvent such as acetone. Other organic solvents, e.g., water soluble alcohols, ketones and esters, will also be suitable.

As above disclosed, this invention has also proved operative to reduce the BOD (Biochemical Oxygen Demand) of sewage waste and other waste waters. This is an important aspect of the invention, particularly when used in treating certain industrial waste waters, such as those from sugar mills and paper-making plants. In some instances, the problems presented by the odiferous characteristics of such wastes are less than those presented by extremely high BOD ratings. As is well known, waste waters having BOD requirements constitute a major cause of water polution in this country, and the control of BOD is one of the most important activities in order to prevent water polution.

The effectiveness of the process of this invention is reducing the BOD of sewage and industrial wastes is illustrated by the following further examples:

EXAMPLE 18

A test was run on one pint amounts of untreated metropolitan sewage with a BOD of 95 p.p.m. using both acrolein and 3-buten-2-one. The table below shows, on the left, the type of active aldehyde or active ketone, the amount used (based on one pint of untreated sewage) and the resultant Biochemical Oxygen Demand (BOD) in parts per million (p.p.m.). The percentage reduction of BOD is also shown.

| Treatment | BOD, p.p.m. | BOD reduction, percent |
|---|---|---|
| Untreated control | 95 | |
| One drop acrolein | 6 | 93 |
| Two drops acrolein | 2 | 98 |
| Four drops acrolein plus 20 p.p.m. H$_2$S [1] | 11 | 88 |
| Two drops 3-buten-2-one | 18 | 81 |
| Four drops 3-buten-2-one | 0 | 100 |

[1] H$_2$S added to simulate sewage with average BOD and sulphide odor problem.

EXAMPLE 19

This test was run on untreated "filter mud" from a sugar mill with an unusually high BOD. The following table illustrates the results obtained on one pint samples of the waste with ten drops acrolein and ten drops 3-buten-2-one. It will be noted that against a stronger BOD, these two chemicals are more efficient. A stronger demand is met by a stronger chemical action.

| Treatment | BOD, p.p.m. | BOD reduction, percent |
|---|---|---|
| Untreated control | 8,222 | |
| Ten drops acrolein | 4,047 | 49.5 |
| Ten drops 3-buten-2-one | 3,776 | 52.9 |

EXAMPLE 20

Another test, similar to Example 19, was run on an untreated sugar mill waste with a lower BOD, using one half the amount of BOD active treating liquid. The results were as follows:

| Treatment | BOD, p.p.m. | BOD reduction, percent |
|---|---|---|
| Untreated control | 4,692 | |
| Five drops acrolein | 997 | 98 |
| Five drops 3-buten-2-one | 95 | 98 |

Specimens of this treated filter mud were next refrigerated for ten days and then re-seeded with bacteria to determine if the BOD reduction was long lasting. The value for the acrolein treated filter mud was 48 p.p.m. BOD. For the 3-buten-2-one treated mud, the figure was 72 p.p.m. BOD. The stabilizing action is for all practical intents and purposes permanent.

From the foregoing examples, it is very evident that the preferred "sulphide active" compounds according to invention, acrolein and 3-buten-2-one, are also very valuable for BOD reduction in wastes. While these two compounds are not oxidizers in the sense of donating oxygen, they do oxidize because they accept hydrogen:

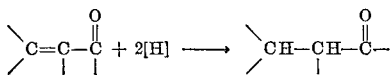

Hence, the demand for oxygen is reduced since oxygen present is spared from reaction with hydrogen.

The existing problem that this invention appears to solve has been succinctly stated by McKinney [1]:

"The lack of a hydrogen acceptor is the chief reason for the inability of anaerobic bacteria to completely degrade organic matter."

As to concentration of treatment, the use of from one to four drops of the preferred active compounds herein provides about 70 to 280 p.p.m. of the active chemical. This should be adequate to treat most municipal sewage in the range of a BOD of 200-300 p.p.m. As noted above however, sugar mill wastes have higher BOD requirements, necessitating use of the active compounds herein in amounts up to at least 2000 p.p.m. Apparently, all sewage has a BOD, but not all sewage has a sulphide odor problem, and the present invention solves both the sulphide odor and BOD problems at the same time.

From the foregoing description it will be recognized that the invention has application to varying sewage conditions, and by "sewage" this specification contemplates industrial wastes as well. The time allowed for sewage to be in transit, the amount of leaking of ground water with a high sulphide content into mains, the temperature, the pH, the detergents allowed, and the source of sewage, whether it is a city, steel mill, brewery, sugar mill or petroleum refinery, affect the exact conditions and procedures to be employed in each specific case according to principles and teachings described above. The invention also has application to the use of the treated compounds in scrubbing towers where the sewage gases may be treated by exposing them to the chemicals herein, as is commonly done with presently used compounds in these towers.

Accordingly, the invention will be understood as limited only by the spirit of the definitions in the following claims.

What I claim is:

1. Process for deodorizing an aqueous solution containing at least one odiferous compound from the group consisting of hydrogen sulphide and compounds containing the —SH group, which comprises mixing therewith at least one sulphide-active alpha,beta unsaturated aldehyde or ketone in an amount sufficient to form the sulphur-containing reaction product of the sulphide-active aldehyde or ketone, thereby substantially to deodorize the solution.

2. The process of claim 1 wherein the mixing is conducted at ambient temperature.

3. The process of claim 1 wherein the sulphide-active compound is a lower alkene ketone.

4. The process of claim 1 wherein the sulphide-active compound is 3-buten-2-one.

5. The process of claim 1 wherein the aldehyde or ketone has the general formula

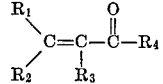

wherein each of the R substituents may be hydrogen, alkyl, or an equivalent substituent.

6. The process of claim 1 wherein the sulphide-active compound is a lower alkene aldehyde.

7. The process of claim 6 wherein the aldehyde is acrolein, or a methyl substituted derivative thereof.

8. The process of claim 1 comprising introducing to aqueous sewage usually from 1 to at least 200 p.p.m. of said alpha,beta unsaturated aldehyde or ketone, based upon the expected sulphide or mercaptan content of said aqueous sewage at a stage in the processing thereof for disposal, whereby the malodorous sulphides, principally hydrogen sulphide and mercaptans, are rendered into essentially nonodorous sulphide derivatives.

9. The process of claim 8 wherein the compound has a sulphide-active group of the formula

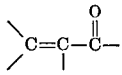

10. Process for deodorizing or reducing the Biochemical Oxygen Demand of an aqueous solution containing sewage or industrial waste products, which comprises mixing therewith at least one alpha,beta unsaturated aldehyde or ketone in amount sufficient to substantially deodorize or reduce the BOD of the solution.

11. The process of claim 10 wherein the solution is treated with up to about 2000 p.p.m. of acrolein or 3-buten-2-one.

12. Process for deodorizing and/or reducing the Biochemical Oxygen Demand of an aqueous solution containing sewage or industrial waste products and having at least one odiferous compound from the group consisting of hydrogen sulphide and compounds containing the —SH group, which comprises mixing therewith at least one alpha-beta unsaturated aldehyde or ketone in an amount sufficient to substantially deodorize and reduce the BOD of the solution.

13. The process of claim 12 wherein the solution is treated with up to about 2000 p.p.m. of acrolein or 3-buten-2-one.

14. The process of claim 12 wherein the amount of odoriferous compound in the aqueous solution is detectable by taste.

15. The process of claim 12 wherein the amount of odoriferous compound in the aqueous solution is at least 3 p.p.m.

16. The process of claim 12 wherein the amount of odoriferous compounds in the aqueous solution is at least 10 p.p.m.

17. The process of claim 12 wherein the aqueous solution is raw sewage.

18. The process of claim 12 wherein the aqueous

---

[1] "Microbiology for Sanitary Engineers," page 101, by R. E. McKinney, published by McGraw-Hill, 1962.

solution is raw sewage of municipal origin and has a BOD of above 200 p.p.m.

References Cited

UNITED STATES PATENTS

| | | |
|---|---|---|
| 2,801,216 | 7/1957 | Yoder et al. |
| 2,987,475 | 6/1961 | Legator. |
| 3,250,667 | 5/1966 | Legator. |

OTHER REFERENCES

Hooper, P. L., et al., J. Chem. Soc. (1934), pp. 1147–1150.

Nicolet, B. H., J. Am. Chem. Soc., 57 (1935), pp. 1098–1099.

Geiger, W. B., et al., J. Am. Chem. Soc., 67 (1945), pp. 112–116.

Stack, V. T., Jr., Ind. and Eng. Chem., vol. 49, May 1957, pp. 913–917.

MICHAEL E. ROGERS, Primary Examiner

U.S. Cl. X.R.

210—59; 424—333